United States Patent
Narasimha et al.

(10) Patent No.: US 10,838,843 B1
(45) Date of Patent: Nov. 17, 2020

(54) PARSING HIERARCHICAL SESSION LOG DATA FOR SEARCH AND ANALYTICS

(71) Applicant: Glassbeam, Inc., Santa Clara, CA (US)

(72) Inventors: Bharadwaj Narasimha, Bangalore (IN); Ashok Agarwal, San Jose, CA (US)

(73) Assignee: Glassbeam, Inc., Santa Clara, CA (US)

( * ) Notice: Subject to any disclaimer, the term of this patent is extended or adjusted under 35 U.S.C. 154(b) by 7 days.

(21) Appl. No.: 16/220,372

(22) Filed: Dec. 14, 2018

Related U.S. Application Data

(60) Provisional application No. 62/599,602, filed on Dec. 15, 2017.

(51) Int. Cl.
  *G06F 11/34* (2006.01)
  *G06F 40/205* (2020.01)
  *G06F 16/901* (2019.01)

(52) U.S. Cl.
  CPC ...... *G06F 11/3476* (2013.01); *G06F 11/3419* (2013.01); *G06F 16/901* (2019.01); *G06F 40/205* (2020.01)

(58) Field of Classification Search
  None
  See application file for complete search history.

(56) References Cited

U.S. PATENT DOCUMENTS

| | | | |
|---|---|---|---|
| 2005/0010572 A1* | 1/2005 | Clark | G06F 16/283 |
| 2008/0285464 A1* | 11/2008 | Katzir | H04L 63/1408 370/241 |
| 2009/0055355 A1* | 2/2009 | Brunner | G06F 16/951 |
| 2015/0180983 A1* | 6/2015 | Hitomi | H04L 67/306 709/203 |
| 2016/0232538 A1* | 8/2016 | Papakostas | G06F 16/48 |
| 2017/0324639 A1* | 11/2017 | Merchant | H04L 43/028 |
| 2019/0327237 A1* | 10/2019 | Bar | H04L 63/102 |

\* cited by examiner

*Primary Examiner* — Joshua Joo
(74) *Attorney, Agent, or Firm* — Van Pelt, Yi & James LLP

(57) ABSTRACT

Techniques are disclosed to parse and store hierarchical session log data for search and analytics. In various embodiments, log data is stored in a memory or other data storage device. A processor coupled to the memory or other data storage device is used to: identify a set of log data associated with a hierarchical session; extract a session attribute from the set of log data; and store the session attribute in a manner that associates the session attribute with the hierarchical session.

20 Claims, 4 Drawing Sheets

PARSING HIERARCHICAL SESSION LOG DATA FOR SEARCH AND ANALYTICS

CROSS REFERENCE TO OTHER APPLICATIONS

This application claims priority to U.S. Provisional Patent Application No. 62/599,602 entitled PARSING HIERARCHICAL SESSION LOG DATA FOR SEARCH AND ANALYTICS filed Dec. 15, 2017 which is incorporated herein by reference for all purposes.

BACKGROUND OF THE INVENTION

Complex software and products and hardware systems and devices typically generate "logs" of operating data on a regular basis, e.g., hourly, daily, etc., or in the case of streams continuously, in real time. Logs may include machine data generated by an application or the software and/or hardware infrastructure used to run the application. Logs may comprise a record of all the events that happened in an application and/or other system. They typically include unstructured or semi-structured information and often contain common parameters such as a time stamp, a serial number or other identifier, and IP or other address, process identifiers, etc. Logs may be provided in the form of files, streams, bundles, emails, messages, or other forms.

For manufacturers and/or users of a large installed base, it may be difficult to receive, process, store, and make use of log data, e.g., to detect, analyze, and predict bugs or other failures; to analyze performance; etc.

A complex system may log events associated with one or more sensors, probes, components, or other subsystems. Logged data may relate to a session, e.g., a communication session between two systems or other users, a session in which a system was used to perform a specific service to a client, patient, or other user. A logged session may include one or more sub-sessions, and each sub-session may include one or more sub-sessions, and so on, to any arbitrary level. For example, each period of use of a distinct sensors, components, and subsystems within a session may comprise a sub-session. Such a hierarchical session may generate hierarchical session-related logged data. It may be difficult to determine programmatically which logged data is associated with which session, especially across many systems, and to detect and capture hierarchical relationships within logged data related to a hierarchical session.

BRIEF DESCRIPTION OF THE DRAWINGS

Various embodiments of the invention are disclosed in the following detailed description and the accompanying drawings.

DETAILED DESCRIPTION

Figure 1:
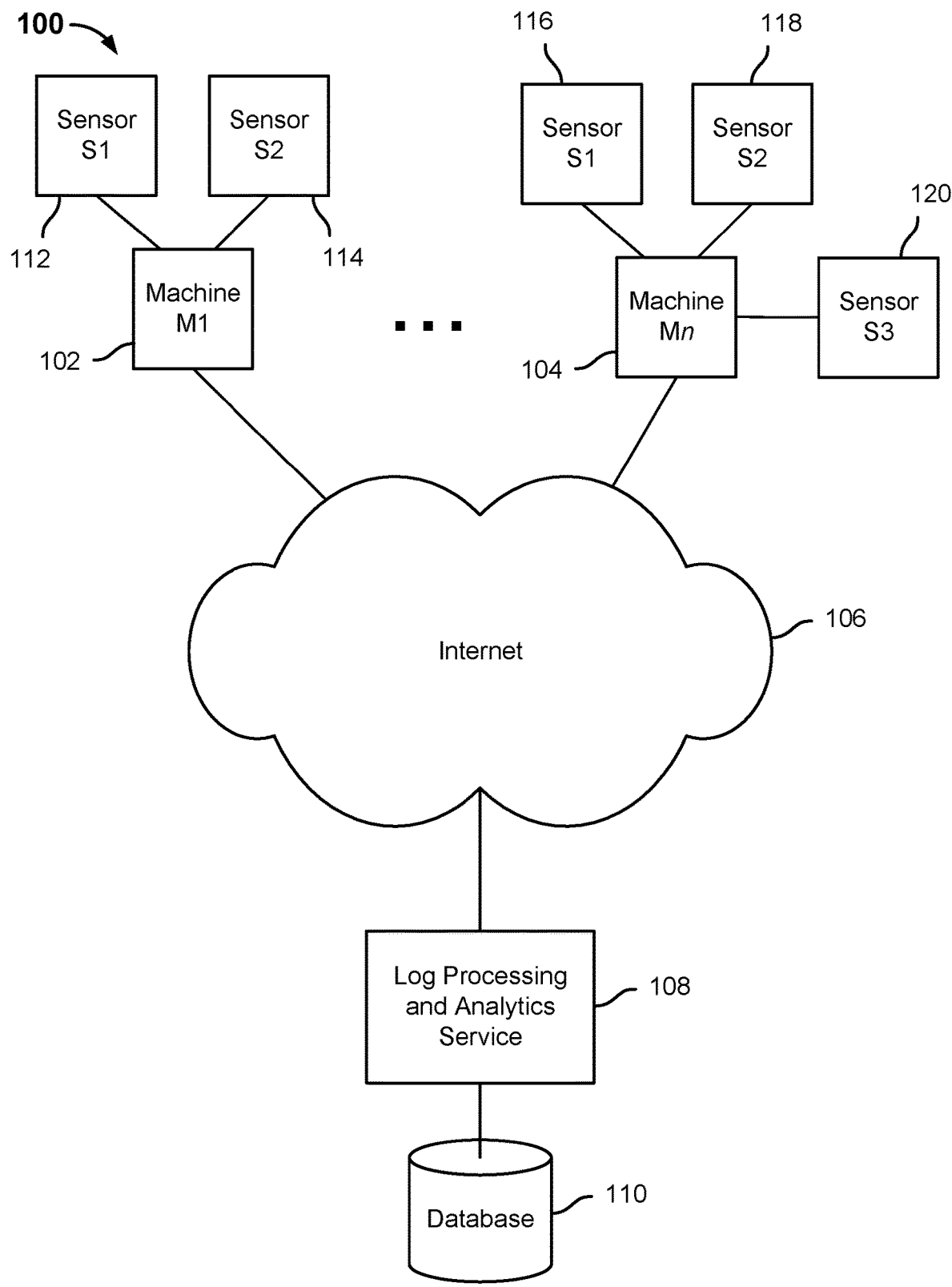
FIG. 1 is a block diagram illustrating an embodiment of a system to process and analyze log data.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques are disclosed to parse and store hierarchical session log data (e.g., log data relating to a same session having one or more sub-sessions within the session, the sub-sessions potentially having sub-sessions within them, etc., to any arbitrary level/depth), e.g., for search and analytics. In various embodiments, no limitation is imposed on number of levels or number of lines at any level. In various embodiments, session-attributes are or may be appended with each session event line (in a fully denormalized fashion in an RDBMS store or as facets in a search store) which enables ad-hoc analytics and search.

In various embodiments, the following terms may be used and refer to the definitions and examples that follow:

Sensor. The term "sensor" is used herein to refer to an electronic component, module, or subsystem embedded in an Internet-of-Things (IoT) or other network-connected machine or device whose purpose is to detect events or changes in its environment and send the information to other electronics, frequently a computer processor. Sensors typically use network connectivity provided by the machine or device to transmit the detected changes.

Sessions. A "session" is a logical collection of events. For example, events collected by a device (such as a medical device like ultrasound, etc.) through the sensors embedded in the device may comprise a "session", such as a single diagnostic procedure or set of procedures performed with respect to a given patient using one or more sensors. The individual events represent the details of activities performed within the session. A session has certain logical computed attributes such as session duration (how long the session lasted from start time to end time), session event count (how many logged events occurred in the session), etc.

SPL (Semiotic Parsing Language). SPL is an ETL (Extract Transform Load) used to describe complex log formats and how to parse them.

LCP (Loader/Compiler/Parser). LCP is a framework watching inputs (files, streams, emails), chooses an SPL program and compiles it into memory.

Actors and Actor Framework. Actors and Actor Framework revolve around actors, which in various embodiments are lightweight, immutable processes each with their own message queue (mailbox). Actors can only interact with the outside world by passing and receiving messages. Messages are queued in the actor's mailbox in the order received, and the next message will be processed only when the current message is completed. Actors are asynchronous and thread-safe.

Message Queue and Message. A message is the smallest unit of work sent to an actor. Mailboxes are message queues attached to each actor, which receive messages sent to the actor by other actors or other processes. Messages are processed one at a time by an actor, though many actors can process messages from their own mailboxes asynchronously.

Sophisticated software systems are similar to complex machines in the sense that they are aggregates of many components, many of whom have multiple instances. And each component (instance) could be working independently within the whole system thus having its own time-ordered sequence of log events. Though such systems have a hierarchy in the way they are built, the logging itself may not be hierarchical—e.g., because multiple components are working in parallel at any given point of time. In such systems logging is separated out for each component (instance). In such conditions, the system as a whole ends up having multiple log files/streams.

However, some complex machines/systems work in a different fashion—although they comprise a hierarchy of components (and instances), at any given point of time there is only one component/instance that is active. The system works by switching the functionality from one component to another in a phased fashion. For systems like this, a single source of log (file or stream) becomes possible. A single hierarchical log that can say which component became active at which point of time, stayed active for how long, and did what operations during that duration. Hierarchy becomes useful as it mirrors the internal structure of the machine. The phase of each component when it is active and logging can be termed as its 'session' or 'sub-session' within the parent session of the machine/system and/or within the higher level sub-session of which it is a child/grandchild session, etc.

While certain examples described herein relate to hierarchical session-related log data associated with a machine having one or more sensors, in various embodiments techniques disclosed herein may be used to parse, extract, store, search, analyze, and/or display log data associated with any hierarchical session having any arbitrary number of levels and/or instances. For example, and without limitation, in some embodiments techniques disclosed herein are used to process log data associated with a network or other communications session. In another example, in some embodiments, techniques disclosed herein are used to process log data associated with use, e.g., by a given user during a given login or other use session, of discrete functional components, modules, apps, etc. comprising a web portal and/or other modularized application or system.

FIG. 1 is a block diagram illustrating an embodiment of a system to process and analyze log data. In the example shown, a set of machines represented in FIG. 1 by machine 102 and machine 104 are configured to send log data via the Internet 106 to log processing and analytics service 108. Log processing and analytics service 108 parses log data receive from the machines (102, 104), extracts logged data, and stores the data in database 110.

In the example shown, the logged data received from the machines (102, 104) may comprises hierarchical session-related logged data. For example, machine 102 includes two sensors (112, 114) and machine 104 includes three sensors (116, 118, 120). In some embodiments, each machine (102, 104) is configured to generate and stream (or otherwise send) via the Internet 106 to log processing and analytics service 108 logged data associated with use of the machine (102, 104) and its component sensors (or other subcomponents and/or subsystems) with respect to a given subject, such as a patient. For example, machine 102 may comprises a medical diagnostic or treatment equipment that has been activated to perform a procedure with respect to a patient P. The sensors (112, 114) may be used in turn to perform the procedure. Each of the machine 102 and the sensors (112, 114) may generate and/or cause to be generated log events associated with the procedure. The procedure and associated log events may be considered and processed as disclosed herein as a hierarchical session, with the procedure comprising a parent session and use of the sensors within the session comprising child or sub-sessions within the parent session for example.

In various embodiments, log processing and analytics service 108 is configured, as disclosed herein, to collect log events associated with a session, extract data associated with the session (e.g., session identifier(s), session attributes, session duration, session event count, etc.) and to store the session-related log events and/or values in database 110. In some embodiments, search and/or analytics tools are provided to enable hierarchical session-related log data to be searched and/or analyzed. For example, procedures using a given type (e.g., model) of machine (102, 104) that last longer than duration d or which sensor S was used more than once may be identified and associated logged data summarized, displayed, represented, etc.

In various embodiments, techniques disclosed herein are used to parse, store, and make available for search and analytics functions and/or processing hierarchical session-related logged data. For example, data logged in the course of performing a diagnostic or other procedure with respect to a patient or other subject, using one or more sensors and/or other components or subsystems, as in the example shown in FIG. 1, may be received and processed as disclosed herein to identify log events (lines) associated with a given session and associated the logged events with the session and, optionally, one or more of a session identifier (session ID), a session duration, a session count (number of logged events in session), and/or one or more session attributes, etc.

In various embodiments, arbitrary log data is process asynchronously and in parallel. In some embodiments, a framework disclosed herein is used to compile, asynchronously and if needed on demand, domain-specific language-based descriptions of complex log formats and how to parse them to generate compiled parsers that are stored in memory and which use an executable class plus actor structure to parse arbitrary log data asynchronously. In various embodiments, the framework may be implemented as a system, process, and/or embodied in a tangible, non-transitory computer readable storage medium, e.g., as a set of computer instructions to implement the framework.

In various embodiments, the framework may operate based on descriptions, expressed in a domain-specific language, of the format and/or content of logs generated by one or more systems. In some embodiments, the description may include a description used to generate code to programmatically identify the start and/or stop of a session and/or sub-session, to determine (e.g., extract from logged data) an identifier to associate with the session and/or with events comprising the session and/or a component sub-session thereof, extract from one or more logged events and associate with the session one or more session attributes, etc.

In some embodiments, SPL (Semiotic Parsing Language), an ETL (Extract Transform Load) language developed by Glassbeam, Inc., may be used to describe complex log formats and how to parse them. In various embodiments, an LCP (Loader/Compiler/Parser) watches inputs (files, streams, emails), chooses a corresponding and/or otherwise suitable SPL (or other parser definition) program, and compiles the SPL into memory. In some embodiments, a context logic and/or module may determine a parser to be used to parse set of log data, e.g., a given file, bundle, stream, etc. The context module may use data included in the log data to determine which parser to use. For example, the context module may extract a sensor address, communication port, or other information from the log data, and map the extracted information to a serial number or other metadata, which in turn may be mapped to a parser definition of a parser to be used to parse the set of log data.

In various embodiments, Functional Programming concepts found in Scala, such as actors, maps, etc., as well as programming concepts such as threads, parallel (SMP) processing and containers, are used to provide and describe an asynchronous compiler as disclosed herein. In various embodiments, software in the Scala programming language running in the Akka framework is used to support a high level of actor-based concurrency. In various embodiments, fault tolerance is provided using this combination, or similar languages and concurrency models in a manner that enables high volumes of log data to be processed with minimal disruption. For example, if a chunk of log data is not able to be processed by a given actor, only that actor is interrupted. The actor may perform exception processing and be reset to be able to resume processing where it left off, all while other actors continue their respective work on other portions of the set of log data.

In some embodiments, a multi-tenant (Log File or Stream) log processing (e.g., LCP) system is provided. In various embodiments, the LCP is able to handle an arbitrary number of parser programs (SPL) and execute them in parallel.

In various embodiments, the LCP receives files, compiles the SPL (or other parser description) on-demand (unless already compiled & cached). In various embodiments, the log data processing system starts to parse the content even before compilation of the parser is complete (in various embodiments by employing a queuing mechanism and message bus, as disclosed herein). The resulting parsed data may be fed, asynchronously, to data stores (e.g., Cassandra, Solr, etc.), in some embodiments via a data abstraction object configured to translate parsed log data into a form required to store the data in the target data store.

Figure 2:
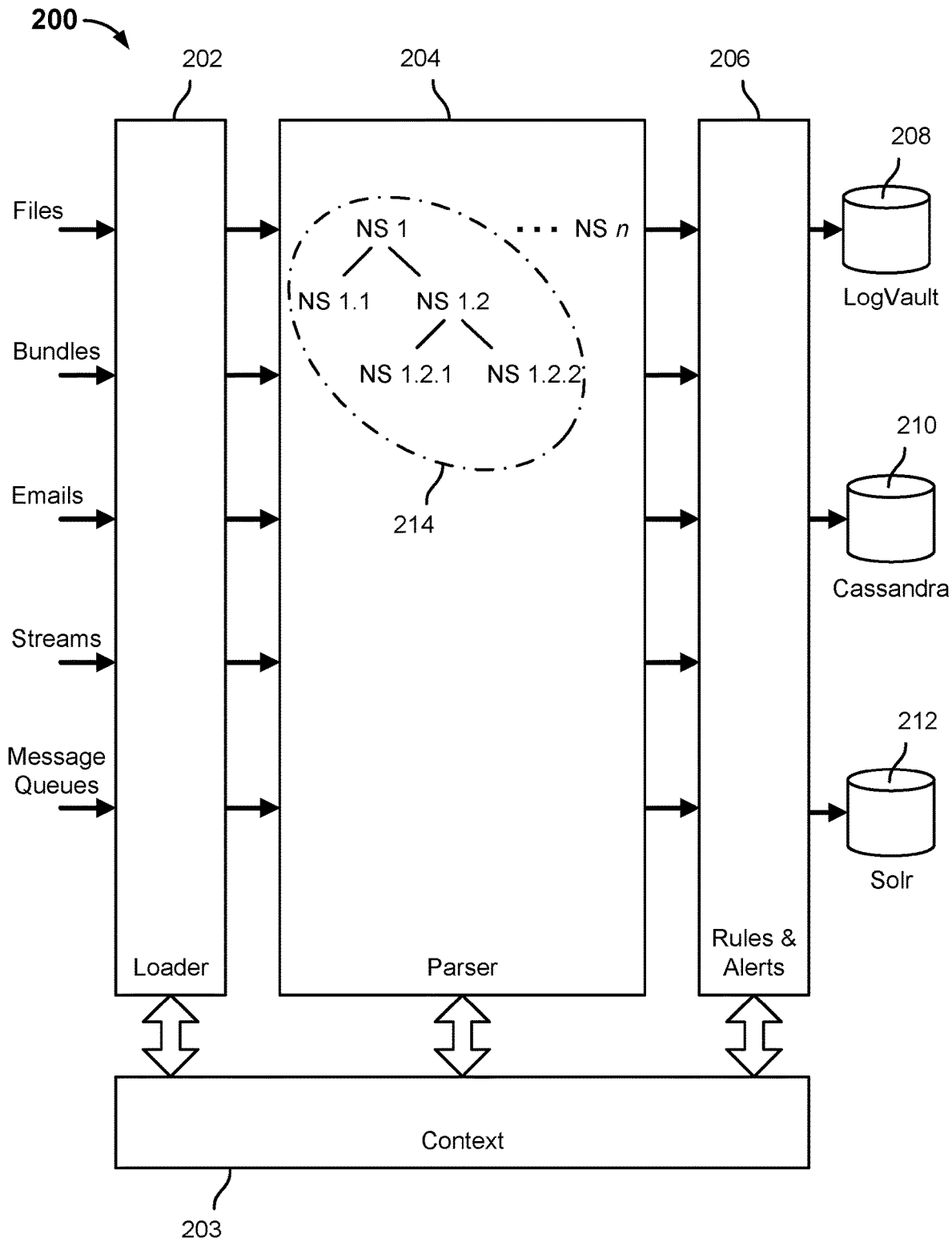
FIG. 2 is a block diagram illustrating an embodiment of a system to process and store log data asynchronously.

FIG. 2 is a block diagram illustrating an embodiment of a system to process and store log data asynchronously. In the example shown, the loader/compiler/parser (LCP) system 200 includes a loader component 202, a context module 203, a parser component 204, a rules and alerts component 206, and a plurality of data stores, including in this example a LogVault data store 208 (e.g., to store raw log data), a Cassandra database 210 (e.g., to store and process parsed log data, such as to facilitate analysis, reporting, etc.), and a Solr data store 212 (e.g., to provide full text search capability).

In various embodiments, each of the loader 202, the parser 204, and the rules/alerts 206 may include a plurality of "actor" entities, each of which is capable of acting independently of and in parallel with other actors comprising the system to load, parse, analyze (e.g. apply rules, generate alerts), and store log data from multiple sources and potentially in diverse forms (e.g., files, streams, etc.) asynchronously and in parallel. In various embodiments, a message bus infrastructure is provided to enable events and other messages to be transmitted between actors comprising the system 200. An actor may have an event or other queue in which log data and/or other data (e.g., messages, events) received via a message bus from other actors may be staged. Each actor may pull data from its queue to be processed.

In some embodiments, data not yet ready to be processed may be left in the queue until the condition(s) required to process the data is/are met. For example, in some embodiments, as described more fully below, parsing of a set of log data (e.g., a file, stream, etc.) may start before the system has finished compiling the parser. For example, a parser may have a hierarchical structure and may comprise one or more actors at each node in the hierarchy. The parser may be able to begin parsing certain log data, associated with nodes for which compilation of the required parsing elements (e.g., actors) has been completed, even while other log data remains held in a queue of the parser, waiting for compilation of parser elements associated with a subtree and/or node with which the other log data is associated to be completed.

In various embodiments, data from numerous and varied sources, and in various forms, may be received concurrently. For example, in the example shown in FIG. 2, log data is shown as being received (potentially) in the form of log files, bundles, emails, data streams, and message queues. In various embodiments, each set of log data is received and processed by one or more actors comprising loader 202. In various embodiments, context module 203 instantiates and/or configures actors comprising loader 202 to refine and/or augment log data by associating context data with received log data. For example, log data may arrive that is identified by a manufacturer's serial number. In some embodiments, the serial number may be used by context 203 to look up other information, such as a manufacturer name, product name, and/or schema (if multiple versions of log data structure may exist for the same product). In some embodiments, a data triplet comprising the manufacturer, product, and schema (M/P/S) may be used to characterize and processing log data. For example, a parser definition to be used to parse the log data may be determined based on the M/P/S determined to be associated with a received set of log data. In some embodiments, the M/P/S triplet may be used as and/or to generate a key to be used to store log data. For example, a Cassandra database has the ability to store large volumes of data quickly, but only supports use of a single key. In some embodiments, the M/P/S triplet or similar data may be used to ensure log data remains segregated in a multi-tenant environment, e.g., one in which multiple different system owners and/or users contract with the same multi-tenant instance of an LCP system such as system 200 of FIG. 2 to process log data from their respective installed product base. In various embodiments, the context 203 may provide the M/P/S or other identifying designation to the loader 202, parser 204, rules and alerts 206, and/or databases such as 208, 210, and 212, to ensure data remains segregated by manufacturer, end user, etc. While in some embodiments an M/P/S triplet may be used to identify and segregate data, e.g., by domain, owner, or otherwise, in various embodiments one or more other sets of data may be used, such as manufacturer/reseller (channel, etc.)/product, etc.

Referring further to FIG. 2, the parser 204 in various embodiments may include one or more instances of each of one or more different hierarchically-structured parsers. In some embodiments, a parser instance is created by compiling a corresponding parser definition that describes the content and structure of a log with which the parser definition is associated and how to parse instances of the log. In some embodiments, each parser may be associated with a top level "namespace" in the hierarchy. The namespace may correspond to and/or be associated with the manufacturer/product/schema triplet described above. In the example shown in FIG. 2, the parser 204 includes n parser instances, represented in FIG. 2 by top level namespaces "NS 1" and "NS n". In the example shown, the top level namespace "NS 1" is associated with a hierarchically structured parser 214, which includes multiple levels of hierarchy, each including zero or more child namespaces. For example, the top level namespace NS 1 includes child namespaces NS 1.1 and NS 1.2, and the latter in turn includes two child namespaces NS 1.2.1 and NS 1.2.2. In some embodiments, namespaces below the top level may correspond to different sections within a set of log data (e.g., a log file).

Each namespace in the hierarchy may be associated with one or more namespace "actors", each of which may be configured to perform such processing tasks as parsing and providing output data based on log data associated with the section (or other portion) with which that namespace is associated, and compiling the definition of the tables and/or child namespaces of that namespace. In some embodiments, each child namespace may represent a sub-section of log data. For example, the parser definition may define one or more tables within a namespace, and for each table may define one or more columns, column operations, other table functions, etc. In some embodiments, a namespace actor may be configured to compile definition statements associated with the namespace, e.g., to generate table structure information (e.g., schema), create table actors to process associated log data, and create child namespaces (if any), including associated actors. In some embodiments, a parser definition may for indicate for each of at least a subset of table elements a corresponding type of parser to be used to parse associated data. For example, if a sub-section of log data with which a table is associated comprises free text, a line-by-line parser may be used. If instead the subsection included XML data, a parser optimized to parse XML may be used. Other examples include parsers optimized to parse name-value pairs, JSON, CSV, or other types of format of log data. In various embodiments, creating an actor may include creating data structures, such a queue in which to stage events or other messages received by the actor, and one or more message buses to be used to send messages to other actors in the system.

In various embodiments, actors are used in loader 202 to receive sets of log data, instantiate parsers, and stream log data (e.g., line by line, in case of log data received other than as a stream) to corresponding parsers. In some embodiments, loader 202 and parser 204 are configured to load and parse hierarchical session-related log data, as disclosed herein.

In various embodiments, complex software, hardware, and/or combined system may comprise many components, one or more of which may have multiple instances. In some systems, each component (instance) could be working independently within the whole system thus having its own time-ordered sequence of log events. Though such systems may have a hierarchy in the way they are built, the logging itself may not be hierarchical—because multiple components may be working in parallel at any given point of time. In such systems logging is separated out for each component (instance). The system as a whole ends up having multiple log files/streams.

However, some complex machines work in a different fashion—although comprised or a hierarchy of components (and instances), at any given point of time there is only one component that is active. The system works by switching the functionality from one component to another in a phased fashion. For systems like this, a single source of log (file or stream) becomes possible. A single hierarchical log that can say which component became active at which point of time, stayed active for how long and did what operations during that duration. Hierarchy becomes useful as it mirrors the internal structure of the machine. The phase of each component when it is active and logging can be termed as its 'session'.

In various embodiments, parsing is not tied to any particular data format or structure. A domain specific language (DSL) is used to identify session boundaries and content. In some embodiments, a DSL and/or architecture as described in U.S. Pat. No. 9,830,368, the entire content of which is incorporated herein by reference as if fully set forth herein, such as the Semiotic Parsing Language (SPL) developed by Glassbeam, Inc., may be used. It can be applied to any log data that is structured in the hierarchical format wherein the session boundaries can be identified through regular expressions (regex's) (or using the various structural definitions supported by the DSL). For example, the parent-child-grandchild data could be any of the following formats and/or any mix of formats:

Format 1: Event Logs
[timestamp] parentid <data>
[timestamp] parentid <data>
. . .
[timestamp] parentid childid <data>
[timestamp] parentid childid <data>
. . .
[timestamp] parentid childid grandchildid <data>
[timestamp] parentid childid grandchildid <data>
. . .
[timestamp] parentid childid <data>
. . .
[timestamp] parentid <data>
Format 2: Name Value Pair
[timestamp] parentid
parent-key1: parent-value1
parent-key2: parent-value2
. . .
[timestamp] parentid childid
child-key1: child-value1
child-key2: child-value2
. . .
[timestamp] parentid childid grandchildid
grandchild-key1: grandchild-value1
grandchild-key2: grandchild-value2
. . .

| Format 3: Tabular | | | |
|---|---|---|---|
| Parent timestamp | Parent data element 1 | | |
| Child timestamp | Child data element 1 | Child data element 2 | |
| GrandChild timestamp | GrandChild data element 1 | GrandChild data element 2 | GrandChild data element 3 |

In various embodiments, one or more of the forgoing formats and/or other formats may be mixed. For example, the parent level log data may be in event format, a child may be in name-value pair formation, and a grandchild may be in table format. Other formats supported in various embodiments include Xml, Json and CSV, for example. In various embodiments, a parent session has all the session-attributes of the child session. For example, in the DSL example below, 'Child1' has all the attributes of the 'Grandchild1'. And 'Parent' has attributes of Child1, Child2, Grandchild1 and Grandchild2. In some embodiments, the parent session count and duration will include that of all children. In some embodiments, there is no limitation on the length (number of log lines) that a session may span and/or no limitation on the number of hierarchical levels. Data in different hierarchical levels can be in completely different formats (they just need to be separately identifiable via regex). There is no limitation on the length of a single line. Lines could also span across 'n' lines (multiline sessions).

In the below example, the following taxonomy/terms are used:

1. 'session-id': In various embodiments, each session has a unique identifier called session-id (the unique identifier could even be the starting timestamp of a session too). Since sessions form a hierarchy, these session-id's will be hierarchical too. Therefore 'session-id1' is used as the name for the unique identifier for top level sessions. 'session-id2' for 2nd level, 'session-id3' for 3rd level and so on 2. 'session-count': Total number of events in a session 3. 'session-duration': Difference of ending and starting timestamp of a session 4. 'session-attributes': each session can have multiple measures. Each measure is called a 'session-attribute'. Each 'session-attribute' has a name, value and data type (int/float/string/timestamp). There is no limitation on the number of 'session-attribute' that can be extracted from a session In some embodiments, the following domain-specific language (DSL) keywords and syntax are used to describe hierarchical session-related log data and to generate programmatically parsers and/or data structures to parse and store hierarchical session-related log data:

1. All keywords of the DSL are in capitals
2. NAMESPACE helps to identify different session boundaries. BEGINS WITH, ENDS WITH and FILEPATTERN are all OPTIONAL
3. TABLE is used to specify the columns and structure of the data within a session. ICON is used to identify the structure. Columns are individual data elements
NAMESPACE Parent BEGINS WITH <regex> ENDS WITH <regex> FILEPATTERN <regex>
NAMESPACE Child1 BEGINS WITH <regex> ENDS WITH <regex> FILEPATTERN <regex>
NAMESPACE Child2 BEGINS WITH <regex> ENDS WITH <regex> FILEPATTERN <regex>
NAMESPACE Grandchild1 BEGINS WITH <regex> ENDS WITH <regex> FILEPATTERN <regex>
NAMESPACE Grandchild2 BEGINS WITH <regex> ENDS WITH <regex> FILEPATTERN <regex>
TABLE Parent NAMESPACE Parent
    ICON <x>
    COLUMN P1<session-id1>
    COLUMN P2<session-count>
    COLUMN P3<session-duration>
    COLUMN P4<session-attr>
    COLUMN P5<session-attr>
    . . .
TABLE Child1 NAMESPACE Parent
    ICON <x>
    COLUMN P1<session-id1>
    COLUMN P2<session-id2>
    COLUMN P3<session-count>
    COLUMN P4<session-duration>
    COLUMN P5<session-attr>
    COLUMN P6<session-attr>
    . . .
TABLE Grandchild1 NAMESPACE Parent
    ICON <x>
    COLUMN P1<session-id1>
    COLUMN P2<session-id2>
    COLUMN P3<session-id3>
    COLUMN P4<session-count>
    COLUMN P5<session-duration>
    COLUMN P6<session-attr>
    COLUMN P7<session-attr>

In various embodiments, a parsing platform, such as parser 202, is built using the Scala programming language and the Akka actor framework. Scala and Akka are a very powerful toolkit to build fast data platforms which use multiple threads and CPU cores very efficiently. Techniques disclosed herein are implemented using multiple actors. Each actor does a small chunk of work and sends a message to the next actor in the pipeline. Akka allows having 'n' instances of any particular type of actor—this capability along with actors leads to fast concurrent parsing. In some embodiments, the first actor in the parsing pipeline is the FileLoader which reads the file line-by-line. It creates a message for each line and sends it to the next actor. The next actor in the pipeline is the ParseSupervisor. This holds the list of top level namepaces (each namespace is a actor) and their begins-with regex patterns. ParseSupervisor finds the namespace corresponding to this incoming line (refer to the algorithm above) and sends the message to this namespace actor. Each NamespaceActor holds the corresponding table and icon definition. It parses the incoming line according to the table/icon definition which leads to finding of session-id and session-attributes. The session-attributes are accumulated in a collection. A variable stores the timestamp of the first incoming line. Another variable holds the line counter. When the last line for this namespace is received, these 2 variables can be used to find the session-duration and session-count. After parsing of this incoming line this actor sends the parsed data (which has 2 parts—session attributes and raw session line) to the next actor in the pipeline. The next actor in the pipeline persists the session-attributes to a specially designed table in Cassandra which has session-id in its key—let's call it attributes table. It stores the raw session line in a separate Cassandra table (which also has session-id as key but also the line number)—let's call this the raw data table. Consequently, by the end of parsing of one session with 'n' lines there is exactly one row for this session in the attributes table and 'n' lines in the raw data table. When the end-of-file is reached, the FileLoader sends a message to the EtlActor. The EtlActor reads the attributes table to determine all the session-ids to ETL. It reads the raw data table to fetch 'n' session lines and for every session line create a single document (for search store like Solr) or row (in a RDBMS like store) which has all the attributes (this will be a full denormalized RDBMS table). This kind of store can now be used for ad-hoc analytics and search.

In various embodiments, techniques disclosed herein are used to detect the beginning and/or end of a logged session and/or sub-session thereof, identify log events (e.g., lines, etc.) associated with the session, extract session identifiers and attributes from logged data, and store session events, identifiers, and/or attributes in a manner that associated such values with the session and log events comprising the session. In some embodiments, log events associated with a session are stored in a temporary storage and/or data structure, e.g., as log events arrive and are processed. Once all log events (lines, etc.) associated with a session have been identified, the events are processed to determine and/or extract identifiers, attributes, etc., which are stored, along with session log events, in more permanent data structures, e.g., database tables.

Figure 3:
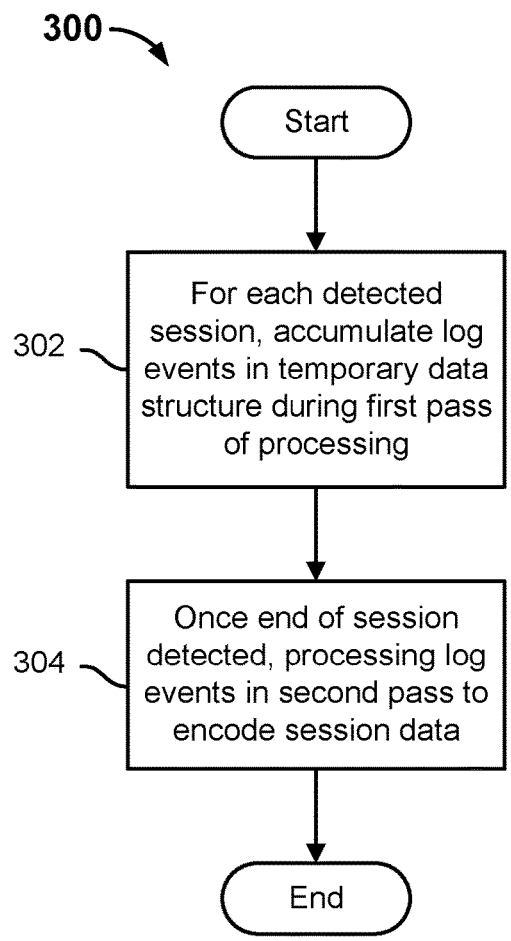
FIG. 3 is a flow chart illustrating an embodiment of a process to perform session-aware processing of log data.

FIG. 3 is a flow chart illustrating an embodiment of a process to perform session-aware processing of log data. In various embodiments, the process 300 of FIG. 3 is implemented by a log processing and analytics server and/or service, such as log processing and analytics service 108 of FIG. 1, and/or by a system to process and store log data asynchronously, such as system 200 of FIG. 2. In the example shown, for each detected session (e.g., hierarchical session), log events for that session are accumulated in a temporary data structure during a first pass of processing (302). Once the end of the session is detected (e.g., log event matches regular expression associated with end of session, time out, etc.), the log events for the session are processed in a second pass, e.g., to extract and encode (e.g., associated with log events) session data (304).

Figure 4:
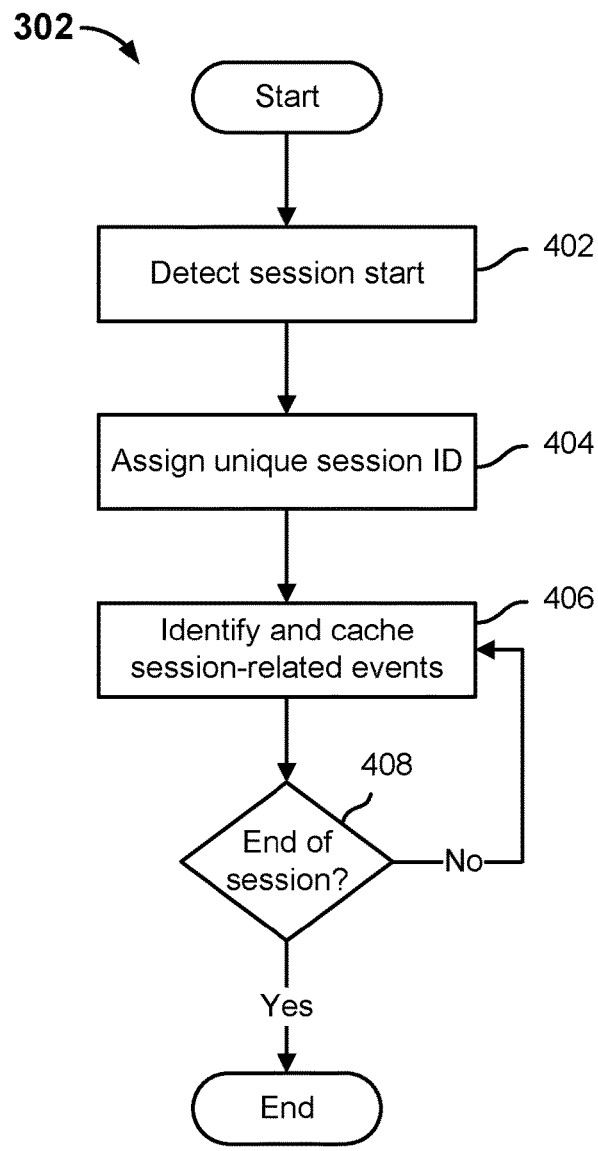
FIG. 4 is a flow chart illustrating an embodiment of a process to associate log data with a session.

FIG. 4 is a flow chart illustrating an embodiment of a process to associate log data with a session. In various embodiments, step 302 of the process of FIG. 3 is implemented at least in part by the process of FIG. 4. In the example shown, the start of a session is detected (402). For example, a log event may match a regular expression associated with the start of a session (or sub-session). A unique identifier is assigned to the session (404). In some embodiments, the unique identifier may comprise a value extracted from a log event associated with the session (e.g., patient number, procedure unique identifier, or other identifier). Log events associated with the session are identified, e.g., as received, and stored in a temporary storage location and/or data structure (406). The events may be received before, during, or after the session start being detected (402). Log events are accumulated and stored in temporary storage until the end of session is detected (408). In some embodiments, the start of sub-sessions (e.g., child, grandchild, etc. sessions) comprising the hierarchical session are detected (402) and unique identifiers are assigned to each level (e.g., child, grandchild, etc.) and/or instance (e.g., child1, child2, etc.) of session comprising the parent session (404). In some embodiments, child, etc. sub-session-related log events are accumulated in temporary storage along with other events comprising the parent session with which the child, etc. events are associated.

Figure 5:
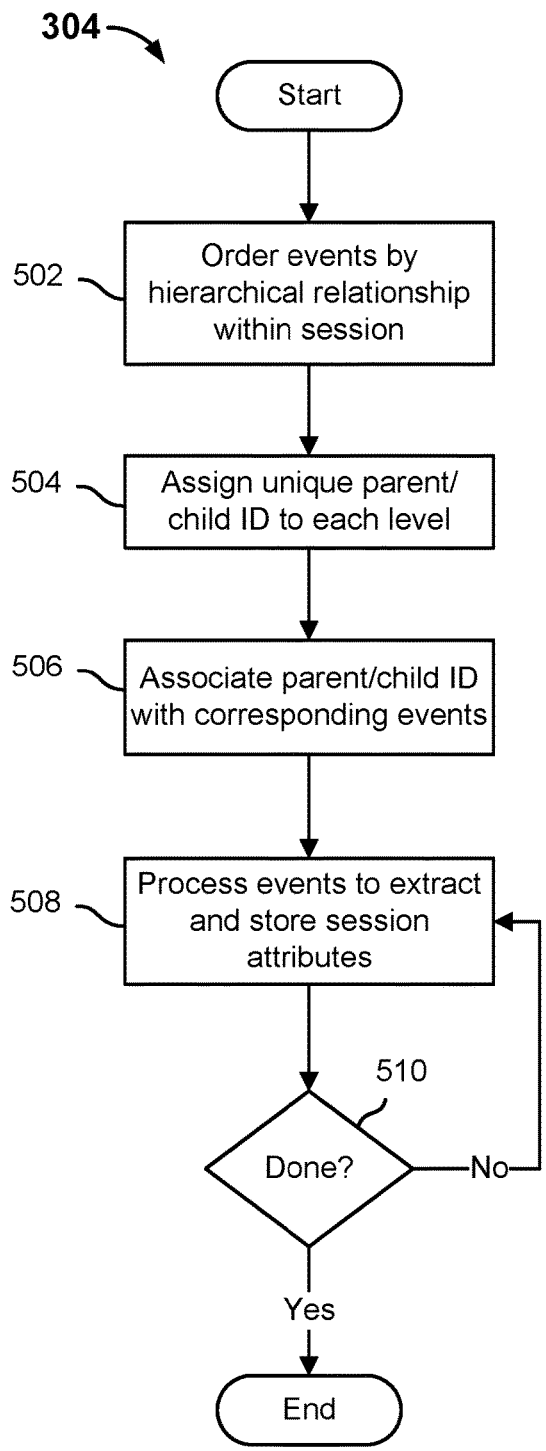
FIG. 5 is a flow chart illustrating an embodiment of a process to process log data associated with a session.

FIG. 5 is a flow chart illustrating an embodiment of a process to process log data associated with a session. In various embodiments, step 304 of the process of FIG. 3 is implemented at least in part by the process of FIG. 5. In the example shown, session-related log events—e.g., events accumulated in temporary storage as in the process of FIG. 4—are ordered according to the hierarchical relationships within the session (502). For example, log events associated with a grandchild sub-session may be grouped together under child-level log events associated with the child session of which the grandchild event is a grandchild session. A unique identifier is assigned to each sub-level (e.g., child, grandchild) of the hierarchy (504). At each level/instance, the unique identifier of that level/instance and the respective identifiers of each level above it is/are associated with the log events at that level (506). For example, for a grandchild level "Grandchild1" the session identifier associated with that grandchild level, the session identifier associated with the "Child1" level of which it is a direct descendant, and the session identifier associated with the parent level may be associated with the log events associated with the "Grandchild1" sub-level. Log events are processed to extract and store session attributes (508). For example, log events may be processed to extract a value to be stored as a session attribute. A session attribute may be stored in a manner that associates the session attribute with all or a subset of log events comprising the session. In some embodiments, a session attribute may be computed, at least in part, e.g., session duration, session count (number of events comprising the session), etc. Processing continues until all log events comprising the session have been processed (510).

Figure 6:
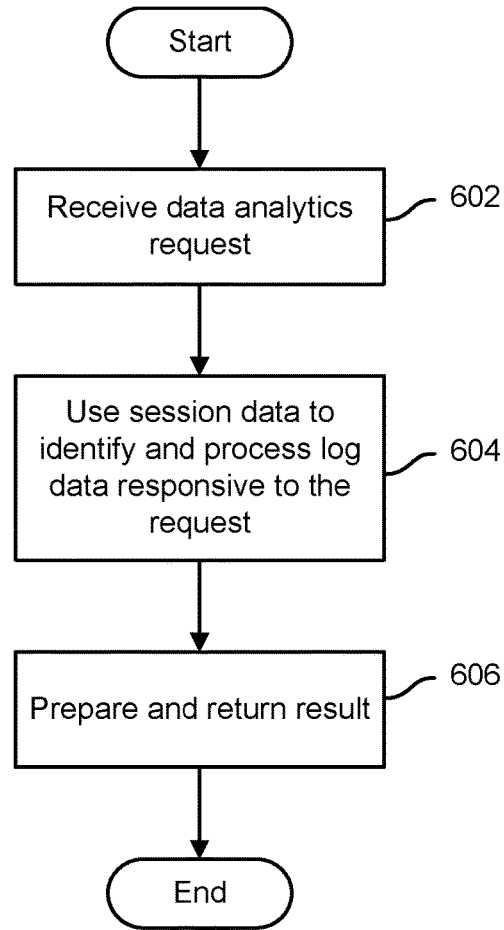
FIG. 6 is a flow chart illustrating an embodiment of a process to respond to a data analytics request associated with log data associated with one or more sessions.

FIG. 6 is a flow chart illustrating an embodiment of a process to respond to a data analytics request associated with log data associated with one or more sessions. In some embodiments, the process of FIG. 6 is performed by a log processing and analytics server and/or service, such as log processing and analytics service 108 of FIG. 1, and/or by a system to process and store log data asynchronously, such as system 200 of FIG. 2. In the example shown, a data analytics request is received (602). In some embodiments, the request may be received via a web-based or other administrative user interface. Hierarchical session-related log data is used to identify, obtain, and process log data responsive to the request (604). For example, log data stored in database 110 in the example shown in FIG. 1 may be searched to identify records (e.g., sessions, sub-sessions, log events, etc.) responsive to the request. The obtained data is used to prepare and provide a response to the request (606).

While certain examples described herein relate to hierarchical session-related log data associated with a machine having one or more sensors, in various embodiments techniques disclosed herein may be used to parse, extract, store, search, analyze, and/or display log data associated with any hierarchical session having any arbitrary number of levels and/or instances. For example, and without limitation, in some embodiments techniques disclosed herein are used to process log data associated with a network or other communications session. In another example, in some embodiments, techniques disclosed herein are used to process log data associated with use, e.g., by a given user during a given login or other use session, of discrete functional components, modules, apps, etc. comprising a web portal and/or other modularized application or system.

In various embodiments, techniques disclosed herein may be used to process hierarchical session-related log data as disclosed herein. Log events may be stored in a manner that associates the log events with a session and/or sub-session to which they correspond. Search and analytics functions based on the session-related nature of the log data are enabled, in various embodiments.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A system to process log data, comprising:
   a memory or other data storage device configured to:
      receive the log data streamed from a medical device, wherein the medical device is configured to perform a procedure including at least one of a medical diagnostic procedure and a medical treatment procedure performed on a subject; and
      store the log data, wherein the log data is associated with log events generated by at least one sensor associated with the medical device; and
   a processor coupled to the memory or other data storage device and configured to:
      identify a set of log data associated with a hierarchical session, wherein the hierarchical session includes a parent session associated with the procedure and a sub-session associated with operation of the at least one sensor within the parent session;
      extract a session attribute from the set of log data; and
      store the session attribute in a manner that associates the session attribute with the hierarchical session.

2. The system of claim 1, wherein the session attribute is associated with each of a plurality of log events associated with the hierarchical session.

3. The system of claim 1, wherein the session attribute is associated with each of a plurality of hierarchical levels comprising the hierarchical session.

4. The system of claim 1, wherein the session attribute comprises a session identifier associated with the hierarchical session.

5. The system of claim 1, wherein the hierarchical session comprises two or more levels.

6. The system of claim 1, wherein each sub-session comprising the hierarchical session has associated therewith a corresponding unique session identifier.

7. The system of claim 1, wherein a session attribute associated with a higher-level sub-session comprising the hierarchical session is inherited by one or more levels below the higher-level sub-session within a hierarchy of the hierarchical session.

8. The system of claim 1, wherein the session attribute is associated with the hierarchical session in a manner that enables a search to be performed based on the session attribute.

9. The system of claim 1, wherein the processor is further configured to receive a search query based at least in part on the session attribute and to return a result associated with the hierarchical session based at least in part on the search query.

10. The system of claim 1, wherein the session attribute comprises one or more of a session start time and a session end time.

11. The system of claim 1, wherein the session attribute comprises a session duration.

12. The system of claim 1, wherein the session attribute comprises a count of logged events associated with a respective session.

13. The system of claim 1, wherein the processor is configured to identify the set of log data associated with the hierarchical session during a first pass of processing received data comprising the set of log data.

14. The system of claim 13, wherein the processor is configured to identify the set of log data as being associated with the hierarchical session at least in part by applying one or more regular expressions to received log data.

15. The system of claim 13, wherein the processor is configured to store successive log events comprising the set of log data in a temporary data structure during the first pass.

16. A system to process log data, comprising:
   a memory or other data storage device configured to:
      receive the log data streamed from a medical device, wherein the medical device is configured to perform a procedure including at least one of a medical diagnostic procedure and a medical treatment procedure performed on a subject;
      store the log data, wherein the log data is associated with log events generated by at least one sensor associated with the medical device; and
   a processor coupled to the memory or other data storage device and configured to:
      identify a set of log data associated with a hierarchical session during a first pass of processing received data comprising the set of log data, wherein the hierarchical session includes a parent session associated with the procedure and a sub-session associated with operation of the at least one sensor within the parent session;
      extract a session attribute from the set of log data during a second pass of processing the set of log data after an end of a session of the hierarchical session is detected; and
      store the session attribute in a manner that associates the session attribute with the hierarchical session.

17. A method to process log data, comprising:
   receiving, by a processor, the log data streamed from a medical device, wherein the medical device is configured to perform a procedure including at least one of a medical diagnostic procedure and a medical treatment procedure performed on a subject;
   storing the log data in a memory or other data storage device, wherein the log data is associated with log events generated by at least one sensor associated with the medical device; and
   using the processor coupled to the memory or other data storage device to:
      identify a set of log data associated with a hierarchical session, wherein the hierarchical session includes a parent session associated with the procedure and a sub-session associated with operation of the at least one sensor within the parent session;
      extract a session attribute from the set of log data; and
      store the session attribute in a manner that associates the session attribute with the hierarchical session.

18. The method of claim 17, wherein the session attribute is associated with each of a plurality of log events associated with the hierarchical session.

19. The method of claim 17, wherein the session attribute comprises a session identifier associated with the hierarchical session.

20. A computer program product to process log data, the computer program product being embodied in a non-transitory computer readable medium and comprising computer instructions for:
   receiving, by a processor, the log data streamed from a medical device, wherein the medical device is configured to perform a procedure including at least one of a medical diagnostic procedure and a medical treatment procedure performed on a subject;
   storing the log data in a memory or other data storage device, wherein the log data is associated with log events generated by at least one sensor associated with the medical device; and using the processor coupled to the memory or other data storage device to:
  identify a set of log data associated with a hierarchical session, wherein the hierarchical session includes a parent session associated with the procedure and a sub-session associated with operation of the at least one sensor within the parent session;
  extract a session attribute from the set of log data; and
  store the session attribute in a manner that associates the session attribute with the hierarchical session.

* * * * *